United States Patent Office 3,356,556
Patented Dec. 5, 1967

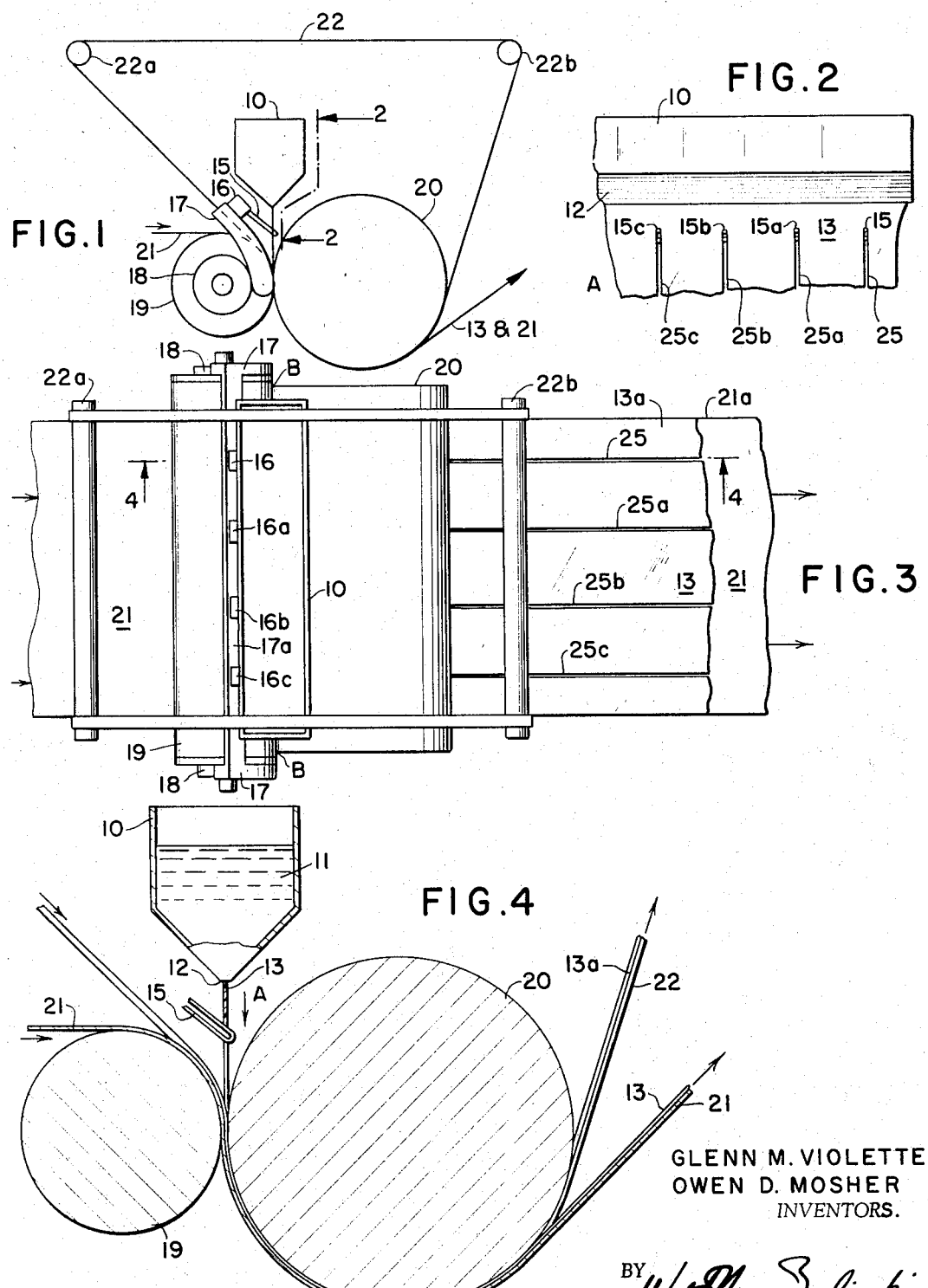

3,356,556
METHOD AND APPARATUS FOR COATING SUBSTRATES WITH FILMS OF UNIFORM THICKNESS
Glenn M. Violette, Greenwich, and Owen D. Mosher, Glens Falls, N.Y., assignors to International Paper Company, New York, N.Y., a corporation of New York
Filed May 11, 1964, Ser. No. 366,460
10 Claims. (Cl. 156—244)

The invention relates to the control of extruded plastic film edge formation. More particularly, it relates to such edge formation when the plastic is a polymer or copolymer of a lower alkyl olefin such as ethylene or propylene.

One of the most serious problems in the extrusion of thin films or sheets of plastics arises with the formation of edges of non-uniform thickness on the extruded material. Thus, for example, in extrusion coating or the process of applying an extruded film of polyethylene or other extrudable plastic to substrates such as paper, paperboard, foil, etc., the hot film is forced through a narrow slit in the extrusion die and is drawn down to final thickness in the area between the die slit and the point of contact with the substrate. And, in this draw-down area (sometimes called the air gap), the molten film shrinks in width or "necks-in," giving rise to beading or the building up of thermoplastic material on the edges of the film. Such beading is present on both longitudinal edges of the extruded film; can be from 2 to 10 times thicker than the rest of the film; and, can, when the full width of the extruded film including the beading is laminated to a substrate of the same or larger width make it practically impossible to wind the coated substrate into a satisfactory roll (unless a wasteful and expensive trimming of the substrate to rid it of the coat bead is performed after extruding and prior to the winding).

It has been proposed to solve or obviate the problem of heavy or uneven edges on extruded plastic materials in the form of films by using metering deckle rods which are disposed on the extrusion die and are adapted to control the beading. See U.S. Pat. No. 2,982,995. However, experimentation with this type of apparatus has failed to provide desired results, due, probably, to the influence of such variables as extruder output, machine speed, plastic temperature, and different types of plastic materials. By contrast, the process and apparatus of the present invention have afforded such consistent results and at a high level of performance.

The process and apparatus of the present invention can also serve other purposes. It is desirable sometimes to have a substrate of paper or the like coated with a material such as polyethylene everywhere but along one or both of the edges of the substrate. Selvage-like margins of uncoated substrate of one-half inch width or so are sought to provide gluing surfaces capable of functioning when low cost adhesives (which are not capable of taking hold of the polyethylene) are used. For other end uses, as in the manufacture of double wall drinking cups from coated paper, wider uncoated areas are wanted, and they can be supplied with the present invention.

In accordance with the present invention, plastic material adapted to coat a substrate is extruded in the form of a hot film or sheet by conventional means and is drawn down to the moving substrate in the familiar way, except for a contacting of the film with one or more wires disposed in the draw-down area and in the path of the film. At the point or points of contact, the film is split longitudinally. Then, after it is split, the material of the film contracts in an inverted V pattern or necks-in until it comes into contact with the substrate to be coated therewith.

The final width of a film split made by the process and apparatus of the present invention has been found to determine the degree or extent of beading on the edges of the film formed by the split. For instance, in test runs conducted with a laboratory extruder, it was found that beading was practically nonexistent when the final width, measured on the paper coated, of the split was about 1.5 inches or less and that beading became noticeable when the final width was greater than about 1.5 inches. Yet, satisfactory rolls of coated paper, whereon uncoated areas (longitudinal stripes) measuring about 2.5 inches were provided in accordance with the present invention, have been made up.

In turn, the final width of the film split herein dealt with has been found to vary with the type of plastic used, e.g., low, medium, or high density polyethylene; machine speed; temperature of the plastic; and, the temperature and position of the wire yielding the split in relation to the nip formed by a pressre roll and a chill roll wherein the plastic is firmly bonded to the substrate. By way of example, wires of tungsten measuring 0.003 inch in diameter and Nichrome measuring 0.011, 0.032, and 0.075 inch in diameter have been used and they have been used unheated except for the influence of the heat of the die and the extruded plastic material (ranging from about 400° F. to 650° F. and from about 350° F. to 600° F., respectively) or heated by means of suitable electrical connections to a 110 volt power source. The 0.032 Nichrome wire was found, in test runs, to perform quite satisfactorily, particularly in that it had a suitable stiffness, needed no excessive current to become suitably heated, and gave excellent results when red hot (i.e., when having a temperature estimated to be between about 600° F. and 800° F.).

For a better understanding of the present invention, reference should be had to the attached sheet of drawings wherein FIGURE 1 is a side view of the apparatus of the present invention;

FIGURE 2 is a sectional front view of the apparatus of FIGURE 1, taken along line 2—2;

FIGURE 3 is a plan view of the apparatus of FIGURE 1; and,

FIGURE 4 is a sectional side view of the apparatus of FIGURE 3, taken along line 4—4.

FIGURES 1 and 4 show an extruder die 10 containing a molten plastic material, e.g., polyethylene 11 and an extruder die opening 12 from which a hot film 13 of the extruded molten plastic material is forced into the so-called draw-down area A. They also depict the disposition of a wire 15 in the path of film 13 as it courses downwardly. Both ends of wire 15 are attached to bracket 16 which is, in turn, mounted on an adjunct of arm 17 which is joined to the support 18 wherein ends of pressure roll 19 are journaled for rotation. The wire ends are, preferably, suitably connected to a source of electrical energy (not shown) so as to become heated when the circuit is closed. It should be understood that the wires could be similarly connected if their ends were attached, instead, to brackets on either side of extruder die 10. The point of attachment, then, is not critical and is only a matter of convenience; positioning bracket 16 on an extension of support 18 permits movement of the wires when pressure roll 19 is moved and facilitates cleaning die 10.

FIGURES 1 and 4 also show a chill roll 20 positioned to contact roll 19 and from a nip B (FIGURE 3) therein. And it shows a web of substrate, e.g., paper 21, passing partially about pressure roll 19, into the nip together with hot film 13, out, and partially around chill roll 20.

FIGURE 2 shows, in particular, the use of additional wires 15a, 15b, and 15c. These are attached to brackets 16a, 16b, and 16c of FIGURE 3, respectively, which are mounted on bar 17a connecting the two arms 17.

The process of the present invention is, perhaps, best illustrated in FIGURES 2 and 3. There, wires 15, 15a, 15b, and 15c are seen to form splits 25, 25a, 25b, and 25c, respectively, in hot film 13 having a thickness of, for example, from about 0.14 to 1.0 mil just after it leaves extruder die 10. Typically, and on the basis of work performed with a 2½ inch barrel diameter Egan extruder having an L/D (length of barrel/diameter of barrel) of 24/1, the temperature of the film made from low density polyethylene is in the range of about 570° F. to 615° F. along the line of its origin at the extruder and the distance from such line to a wire is in the range of about ¾ inch to 3 inches. The machine speed is in the range of about 500 ft. per min. Then, split film 13 is passed further through draw-down area A (see FIGURES 2 and 4) and into nip B between rolls 19 and 20, together with web 21 which will constitute the substrate coated in the process. The distance travelled by the film, i.e., the distance from the line of its origin at extruder die 10 to nip B, is, for example, from about 3 inches to 5 inches. At nip B, film 13 is bonded to web 21 by means of pressure roll 19 which is set, normally, to deliver a pressure of from about approximately 100 lbs. per lineal inch. Simultaneously, film 13 is chilled by means of chill roll 20, which is held at a temprature of from about 50° F. to 120° F. Such chilling enables the necessary release of the plastic material of film 13 from backing roll 20. And it leads to the production of the largely coated, partially uncoated web material which is shown coming off the apparatus in FIGURE 3 and which, along the lines defining the coated and uncoated areas of its surface, has smooth, beadless edges on the plastic coating.

If it is desired to coat the substrate 21 everywhere but along one side 21a thereof, wires 15a, 15b and 15c are removed from the path of film 13 as it approaches nip B, while wire 15 is held in place and allowed to form split 25 in the film. In addition, endless belt 22 (FIGURES 1 and 4) is brought into play. Belt 22 is made of a plastic releasing material such as the commercially available synthetic, Teflon. The belt is mounted on rollers 22a and 22b and on chill roll 20, which propels it. And it is so disposed on the portion of the surface of chill roll 20 it touches that it is interposed between film 13 and substrate 21 over the distance they are wrapped about roll 20. It is disposed with one of its edges aligned with split 25 of film 13 and the other of its edges aligned with or extending beyond side 21a of substrate 21. As a result, when nip B passes the main body of film 13 against substrate 21, it presses that portion 13a of the film separated therefrom by split 25 against belt 22. Thereafter, as belt 22 is led in a different direction than is substrate 21 (see FIGURE 4), belt 22 carries away trim 13a, presumably to a plastic material recovery unit involving air means to take trim 13a up from belt 22. However, it should be noted that endless belt 22 is used only when uncoated areas of more than 2 inches in width are required. For uncoated areas of less than 2 inches in width, the outside portion of trim 13a lies beyond the edge of the substrate 21 and can be removed without reference to a belt.

What is claimed is:

1. In the coating of a moving substrate with an extruded thermoplastic material, the step of extruding the thermoplastic material in the form of a film, the step of directing the film along a path, the step of splitting the film longitudinally by means of at least one wire disposed in the path of the film, the step of drawing the split film down to the substrate, and the step of laminating the split film to the substrate.

2. The process of claim 1 in which the substrate is paper.

3. The process of claim 1 in which the thermoplastic material is selected from the group consisting of polymers and copolymers of lower alkyl olefins.

4. The process of claim 1 in which the thermoplastic material is polyethylene.

5. The process of claim 1 in which the film has a thickness of from about 0.14 to 1.0 mils.

6. The process of claim 1 in which the wire is heated to a temperature of from about 400° F. to 800° F.

7. In an apparatus for coating a moving substrate with an extruded thermoplastic material, means for extruding the thermoplastic material in the form of a film, means for directing the film along a path, at least one wire disposed in the path of th film to split it longitudinally, means for drawing the split film down to the substrate, and means for laminating the split film to the substrate.

8. The apparatus of claim 7 in which the wire measures from about 0.003 to 0.075 inch in diameter.

9. The apparatus of claim 7 in which the wire is heated to a temperature of from about 400° F. to 800° F.

10. The apparatus of claim 7 in which the means for laminating the split film are pressure rolls disposed to form a nip.

References Cited

UNITED STATES PATENTS

| | | | |
|---|---|---|---|
| 2,944,586 | 7/1960 | Yanulis | 156—498 |
| 3,177,109 | 4/1965 | Ziegler | 156—259 X |

EARL M. BERGERT, *Primary Examiner.*

T. R. SAVOIE, *Assistant Examiner.*